(12) United States Patent
Jiao et al.

(10) Patent No.: US 7,791,605 B2
(45) Date of Patent: Sep. 7, 2010

(54) UNIVERSAL RASTERIZATION OF GRAPHIC PRIMITIVES

(75) Inventors: Guofang Jiao, San Diego, CA (US); William Torzewski, San Diego, CA (US); Chun Yu, San Diego, CA (US); Brian Ruttenberg, Goleta, CA (US)

(73) Assignee: QUALCOMM Incorporated, San Diego, CA (US)

( * ) Notice: Subject to any disclaimer, the term of this patent is extended or adjusted under 35 U.S.C. 154(b) by 618 days.

(21) Appl. No.: 11/742,753

(22) Filed: May 1, 2007

(65) Prior Publication Data

US 2008/0273028 A1 Nov. 6, 2008

(51) Int. Cl.
*G06T 11/20* (2006.01)
*G09G 5/00* (2006.01)

(52) U.S. Cl. .................................. 345/441; 345/620
(58) Field of Classification Search ................. 345/620, 345/441–443
See application file for complete search history.

(56) References Cited

U.S. PATENT DOCUMENTS

| | | | |
|---|---|---|---|
| 6,577,305 B1 * | 6/2003 | Duluk et al. | 345/419 |
| 6,788,301 B2 | 9/2004 | Thrasher | |
| 7,218,331 B2 | 5/2007 | Huang et al. | |
| 7,292,242 B1 * | 11/2007 | Wittenbrink et al. | 345/421 |
| 2004/0183811 A1 | 9/2004 | Qi et al. | |
| 2004/0227772 A1 * | 11/2004 | Huang et al. | 345/622 |
| 2006/0050077 A1 * | 3/2006 | D'Amora et al. | 345/567 |
| 2007/0165035 A1 * | 7/2007 | Duluk et al. | 345/506 |

OTHER PUBLICATIONS

International Search Report—PCT/US08/062216—International Search Authority, European Patent Office—Sep. 15, 2008.
Written Opinion—PCT/US08/062216—International Search Authority, European Patent Office—Sep. 15, 2008.
Pineda J, "A parallel algorithm for polygon rasterization," Computer Graphics USA, vol. 22, No. 4, Aug. 1988, pp. 17-20.

(Continued)

*Primary Examiner*—Ryan R Yang
(74) *Attorney, Agent, or Firm*—Timothy F. Loomis; James R. Gambate, Jr.

(57) ABSTRACT

A technique for universally rasterizing graphic primitives used in computer graphics is described. Configurations of the technique include determining three edges and a bounded region in a retrofitting bounding box. Each primitive has real and intrinsic edges. The process uses no more than three real edges of any one graphic primitive. In the case of a line, a third edge is set coincident with one of its two real edges. The area between the two real edges is enclosed by opposing perimeter edges of the bounding box. In the case of a rectangle, only three real edges are used. The fourth edge corresponds to a bounding edge provided by the retrofitting bounding box. In exemplary applications, the technique may be used in mobile video-enabled devices, such as cellular phones, video game consoles, PDAs, laptop computers, video-enabled MP3 players, and the like.

32 Claims, 6 Drawing Sheets

OTHER PUBLICATIONS

Cox M., et al., "Architectural Implications of Hardware-Accelerated Bucket Rendering on the PC," Siggraph/Eurographics Conference on Graphics Hardware, 1997, pp. 25-34.

McCormack J., et al., "Tiled Polygon Traversal Using Half-Plane Edge Functions," Proceedings 2000 Siggraph/Eurographics Workshop on Graphics Hardware. Interlaken, Switzerland, Aug. 21-22, 2000, pp. 15-21.

Akenine-Moller T., et al., "Graphics for the masses: a hardware rasterization architecture for mobile phones," ACM Transactions on Graphics, ACM, vol. 22, No. 3, Jul. 1, 2003, pp. 801-808.

European Search Report—EP08006536—Search Authority, Munich—Sep. 15, 2008.

European Written Opinion—EP08006536—Search Authority, Munich—Sep. 15, 2008.

* cited by examiner

UNIVERSAL RASTERIZATION OF GRAPHIC PRIMITIVES

BACKGROUND

1. Field

The present disclosure relates generally to the field of computer graphics and, more specifically, to universal rasterization of graphic primitives.

2. Background

In computer graphics, high-level representation of an image necessarily contains elements defined in a domain that is different from pixels. Such elements are referred to as graphic primitives, from which more complicated images can be constructed.

In 3D rendering, commonly used graphic primitives include triangles, lines, point sprites, and rectangles. In computer graphics, rasterization is the process used to convert a graphic primitive in a two-dimensional image for a display and assign to each element of the image properties, or attributes, such as color, thickness, depth, and the like. Presently, rasterization is the most popular technique for producing real-time 2D/3D computer graphics applications. In such applications, image frames are generated at a rate of about 20-30 frames per second, which translates in a need for significant computational resources.

Each graphic primitive has specific rasterization algorithms and interpolation formulas for the attributes. For example, a triangle has three vertices and three edges, and attributes for its inner pixels may be interpolated using barycentric or digital differential analyzer (DDA) interpolation, whereas a line has two vertices and its attributes are linearly interpolated. Support of multiple rasterization algorithms requires amounts of computational resources and energy that, in many cases, exceed capabilities of video data processing apparatuses and, in particular, capabilities of mobile video-enabled devices.

As a result, in many mobile video-enabled devices, only a triangle rasterizer is implemented and other graphic primitives are emulated using respective pluralities of triangles. However, this approach also requires substantial computational, memory, and bandwidth overhead. Despite the considerable efforts devoted in the art to increasing efficiency of rasterization routines, further improvements would be desirable.

There is therefore a need in the art for techniques to efficiently implement universal rasterization of graphic primitives.

SUMMARY

Techniques for rasterizing graphic primitives are described herein. In one configuration, a device comprises a processing unit including means for superimposing vertices for an identified graphic primitive on a bounding box. The processing unit also includes means for determining, for distinct geometrical graphic primitive shapes, three edges bounded by the bounding box for the identified graphic primitive. The device optionally includes a memory coupled to the processing unit.

In one design, (i) the three edges for a triangle are based on three intrinsic edges of the triangle superimposed in a bounding box; (ii) the three edges of a line coincide with two opposing parallel edges of the line with a third edge set coincident with one of the two opposing parallel edges and bounded by opposite perimeter edges of a bounding box of the line; (iii) the three edges of a rectangle selectively coincide with three adjacent edges of a bounding box of the rectangle and bounded by a perimeter edge of the bounding box; and (iv) a point sprite is emulated as the rectangle contracted to a size of a point.

In another configuration, an integrated circuit includes a processing unit to implement a set of operations for superimposing vertices for an identified graphic primitive on a bounding box and for determining, for distinct geometrical graphic primitive shapes, three edges bounded by the bounding box for the identified graphic primitive. The integrated circuit also includes a storage unit to store operands and results for the processing unit.

In a still further configuration, a device comprises a processing unit to implement a set of operations to retrofit graphic primitives of distinct geometrical shapes using a unified set of half plane equations which calculate three edges for each graphic primitive of the distinct geometrical shapes. The device optionally includes a memory coupled to the processing unit.

Various aspects and configurations of the invention are described in further detail below.

The Summary is neither intended nor should it be construed as being representative of the full extent and scope of the present invention, which these and additional aspects will become more readily apparent from the detailed description, particularly when taken together with the appended drawings

BRIEF DESCRIPTION OF THE DRAWINGS

Aspects and configurations of the disclosure will become more apparent from the detailed description set forth below when taken in conjunction with the drawings in which like reference characters identify corresponding throughout.

The appended drawings illustrate exemplary configurations of the invention and, as such, should not be considered as limiting the scope of the invention that may admit to other equally effective configurations. It is contemplated that features or steps of one configuration may be beneficially incorporated in other configurations without further recitation.

DETAILED DESCRIPTION

The term "exemplary" is used herein to mean "serving as an example, instance, or illustration." Any configuration or design described herein as "exemplary" is not necessarily to be construed as preferred or advantageous over other configurations or designs, and the terms "core", "engine", "machine", "processor" and "processing unit" are used interchangeably.

Figure 1:
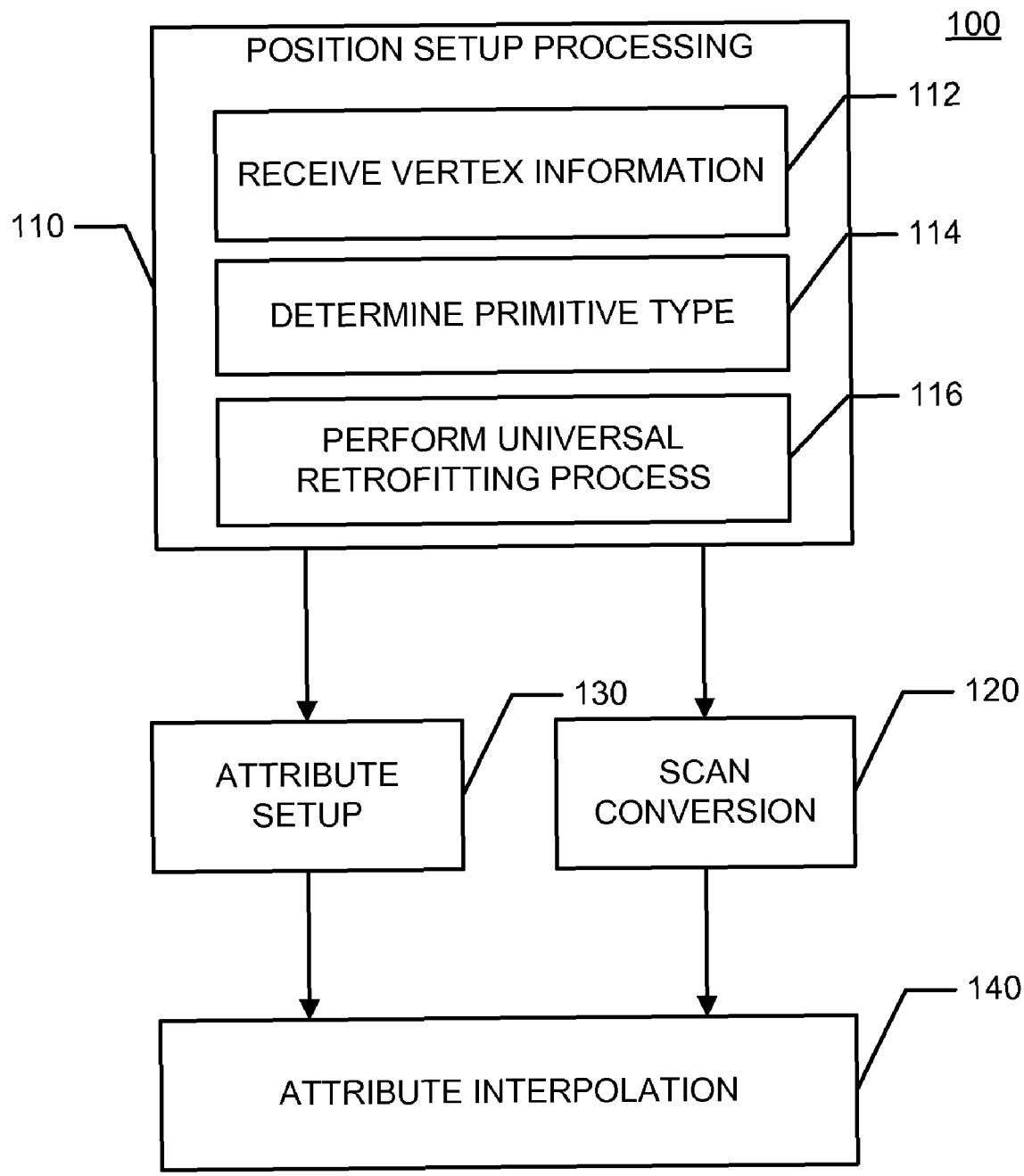
FIG. 1 shows a flow diagram illustrating a method for universally rasterizing graphic primitives.

Referring to the figures, FIG. 1 depicts a flow diagram illustrating a method 100 for universally rasterizing graphic primitives in accordance with one configuration of the present invention. In exemplary applications, the method 100 may be used to for rendering scenes of computer graphics in video-enabled devices, including, but not limited to, cellular phones, video game consoles, personal digital assistants (PDAs), laptop computers, video-enabled MP3 players, wireless devices, wireless communication devices and the like.

In various configurations, the method 100 is performed in the depicted order or the processes in at least two of the blocks or portions thereof shown may be performed contemporaneously, in parallel, or in a different order.

At block 110, position setup processing is performed for pluralities of graphic primitives, of distinct geometrical graphic primitive shapes, of a particular rasterized image. Generally, the position setup processing includes one or more computational routines, such as edge setup, determinant computing, attribute coefficients setup, texture coordinates setup, backface culling, scissoring, and the like. Some of these routines may selectively be performed only for particular graphic primitives or executed in parallel for different graphic primitives. In the depicted configuration, block 110 illustratively includes sub-blocks 112, 114 and 116.

At sub-block 112, a vertex stream is received for at least one graphic primitive of distinct geometrical graphic primitive shapes. Sub-block 112 is followed by sub-block 114 where the primitive type is also determined for a graphic primitive. For example, primitives include triangles, lines, rectangles, and point sprites of a respective image to be rasterized. Thus, the distinct geometrical graphic primitive shapes include a triangle shape, a line shape, a rectangle shape and a point shape, all of which are different. Sub-block 114 is followed by sub-block 116 where a universal retrofitting process 300 is performed for the primitives of the distinct geometrical graphic primitive shapes.

In general, the universal retrofitting process 116 employs a universal computer model to emulate a bounded area having three retrofitted edges e0, e1, and e2, as best seen in FIGS. 2A-2D. The three retrofitted edges e0, e1 and e2 are generated by superimposing the received vertex information, at sub-block 112, for a graphic primitive onto a bounding box and calculate two or three real edges intrinsic to the graphic primitive.

Figure 2B:
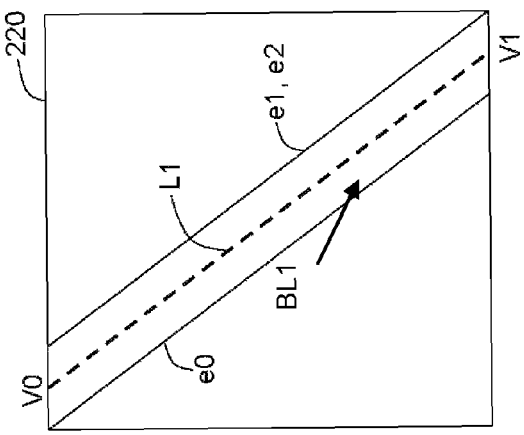
FIGS. 2A-2D show diagrams illustrating retrofitted primitive bounded regions in a bounding box for graphic primitive rasterized using the method of FIG. 1.
Figure 2D:
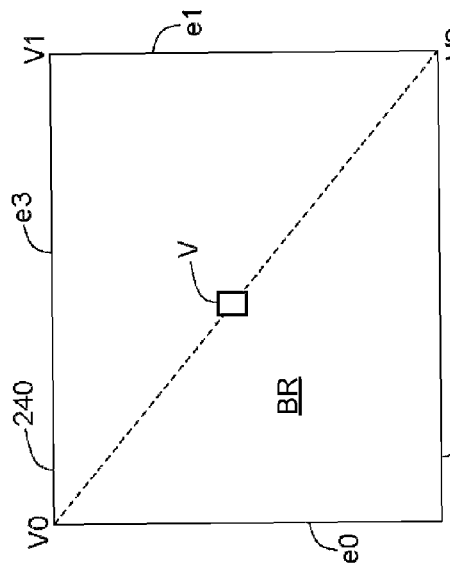
Figure 2A:
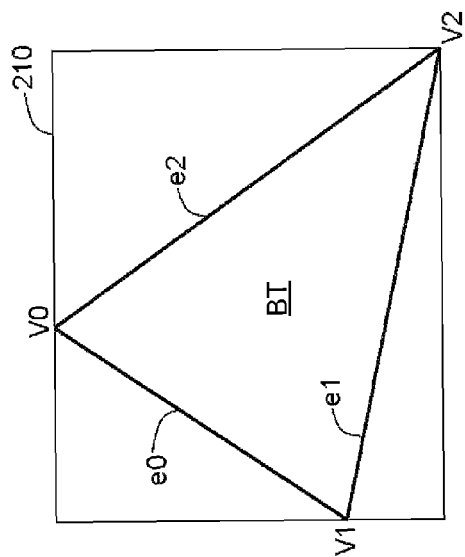
Figure 2C:
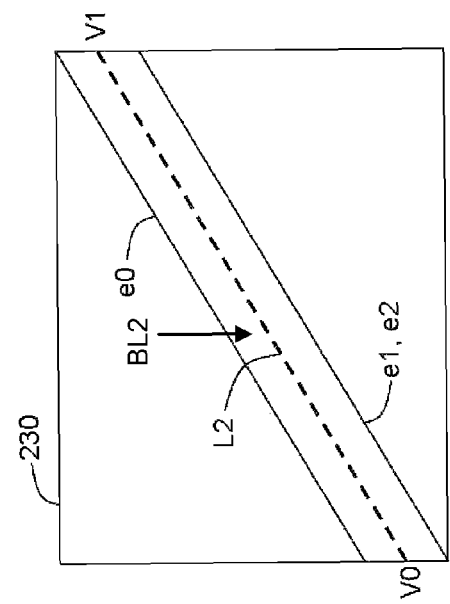
Figure 3:
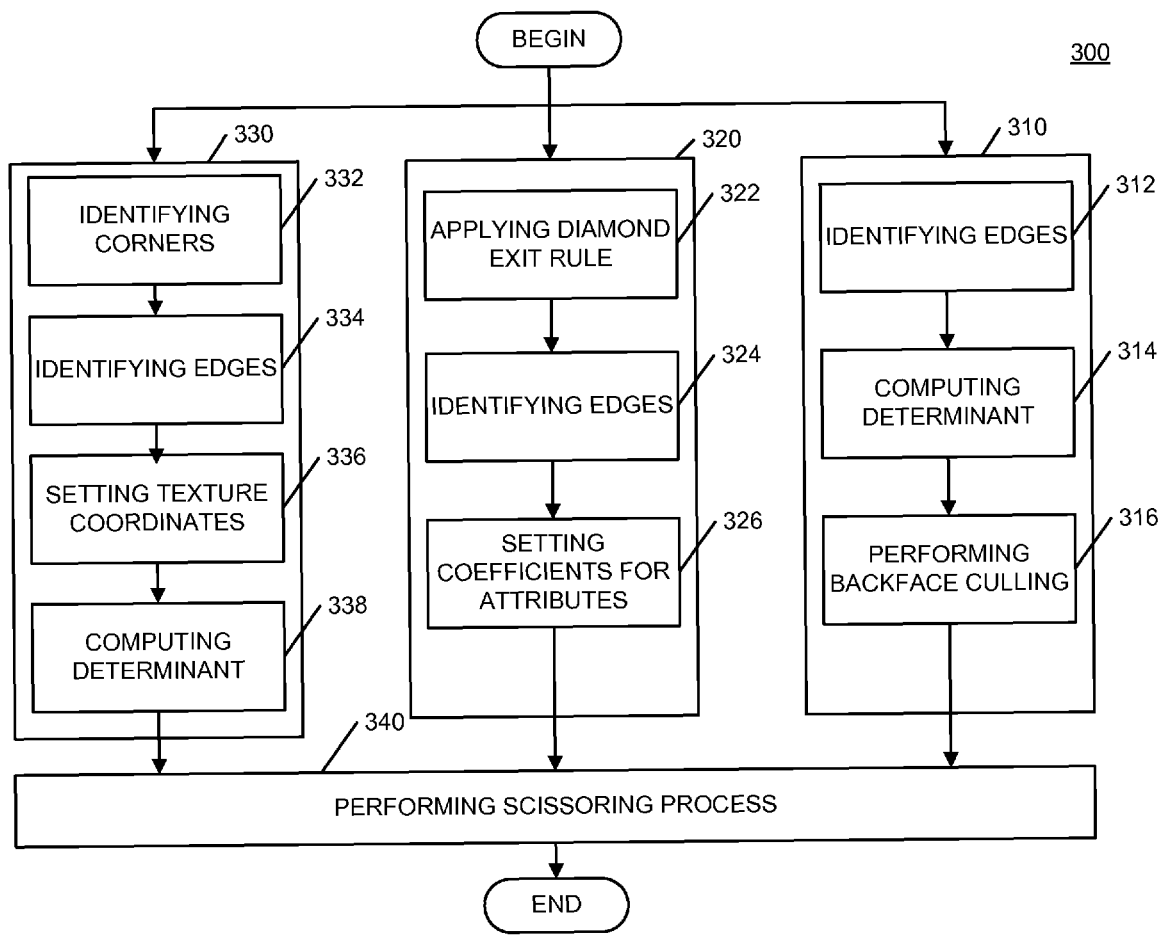
FIG. 3 shows a flow diagram illustrating the universal retrofitting process performed during position setup processing to form the retrofitted primitive bounded region in a bounding box using the method of FIG. 1.

FIG. 3 shows a flow diagram illustrating the universal retrofitting process 300 performed during position setup processing at block 110 to form a retrofitted primitive bounded region in a bounding box. The universal retrofitting process 300 includes various computational routines selectively performed for particular graphic primitives. The depicted computational routines includes routine 310 for triangle-type primitives, routine 320 for line-type primitives, and routine 330 for rectangle-type primitives and point sprite-type primitives. The universal retrofitting process 300 also includes a universal primitive scissoring process at block 340. In particular configurations, at least portions of these routines may be executed in parallel or in a different order. To best understand the invention, the reader should refer to FIGS. 2A-D and 3, simultaneously.

Referring to the routine 310, at block 312, three edges are determined for the triangle primitive based on the vertex information. The vertex stream includes vertex information for each vertex in the stream. The vertex information includes position data having x, y, z and/or w parameters. The vertex information may include vertex index data and shape data. The vertex information may further include color data, texture data and/or other vertex setting data adapted to be placed in a vertex index array. The position data may be transformed to two-dimensional space to create vertices.

At block 314, a determinant (i.e., area) of the triangle is computed and, at block 316, a backface culling process is performed to remove, if applicable, the triangle facing away from a viewer by checking the sign of the determinant. The output from block 316 is sent for additional processing by the scissoring process at block 340, described in detail later.

FIGS. 2A-2D depict diagrams illustrating bounded regions in a bounding box of a triangle (FIG. 2A), a y-major line L1 (FIG. 2B), an x-major line L2 (FIG. 2C), and a rectangle/point sprite V (FIG. 2D) that are rasterized using the method of FIG. 1.

Referring to FIG. 2A, the bounded region, denoted as BT, of a triangle is superimposed on and/in the bounding box 210. The bounded region BT is identified using data representative of three calculated edges e0-e2 and the vertices V0-V2 superimposed on the bounding box 210. The vertices V0-V2 may be generated from or extracted from the received vertex information (block 112) corresponding to a triangle-type primitive. One of the vertices (as shown, vertex V2) coincides with a corner of a bounding box 210, and other vertices are disposed on the sides of the bounding box 210, which oppose that corner. In the scan process described below, three half planes defined by the respective edges determine and bound an "inner" area of the triangle to be rendered. Triangles may arbitrarily be oriented and shaped, such as acute, right or obtuse triangles, slim, fat, and slant triangles.

In the triangle-type primitive, the three edges e0, e1 and e2 coincide with the real or intrinsic triangle edges corresponding to a triangles shape. This triangle shape defines the bounded region BT.

Referring to the routine 320 and FIG. 2B, a diamond exit rule is applied to determine a displayed portion of a line-type primitive at block 322. At block 324, vertex coordinates of the line L1 are superimposed on a bounding box 220. Then, three edges e0, e1, and e2 for the line L1 are identified in the bounding box 220. Two of the edges e0 and e1 are parallel and directed oppositely and coincide with the real or intrinsic edges defining the line L1 as the same slope of the line L1. The line's intrinsic edges are intrinsic in that they correspond to parallel edges of the line L1 separated by a width of the line L1.

When determining the three edges for a line L1, the third edge is set to be coincident to one of the other edges e0, e1. In this example, the third edge e2 is set coincident to edge e1. This creates a continuous area between edges e0 and e1 (e2). When processing an area based on three edges because edge e1 and edge e2 are coincident, the values would be simply a duplication. The duplicated set of data is still valid data that may be used.

In order to create the bounded region BL1, the perimeter of the bounding box 220 is used to limit this continuous area for the line L1 to a closed rendering or rasterization area within the perimeter or border of the bounding box 220. This closed rendering or rasterization area is the bounded region BL1. The bounded region BL1 is bounded at the distal ends of the edges e0 and e1 (e2) and the section therebetween at the perimeter edge or border of the bounding box 220. At block 326, coefficients for an attribute setup of a line segment are calculated in order to utilize attribute setup process 130 of a triangle for a line segment. For example, set some coefficients to be zero and one and replace triangle determinant with line length in its major direction etc. in the end, process 130 will be executed to achieve attribute setup result for line segments.

Referring to FIGS. 2B-2C, the bounded region of a line segment begins with characterizing a line segment as either an x-major line segment or a y-major line segment. The x-major line segments have a slope in a closed interval [−1,1], and all other line segments are considered as y-major line segments, wherein the slope is defined by endpoints of the respective segment. To determine if line ends should be displayed, a diamond exit rule may be used for both x-major and y-mayor line segments.

Referring still to FIG. 2B, the line L1 is a y-major line (shown with a broken line). From the vertex processing stage, the vertex information may be extracted and/or used to generate vertices V0, V1. The two edges e0, e1 are determined based on the opposite (real or intrinsic) edges of the line L1 (each line has a width component). The third edge e2 is set to be coincident with one of the other known edges e0 and e1. Vertices V0, V1 of the line L1 are disposed on opposing horizontal sides of the bounding box 220. Edges e0 and e1 (corresponding to the opposite edges of the line L1) have the same slopes as line L1 but opposite orientations. The edge e0 is located away from the line L1 at a horizontal distance equal to at least half of a width of the line L1. Accordingly, the edge e1 is located, at the same horizontal distance, on the opposite side from the line L1. The top and bottom sides of the bounding box 220 are applied to enclose or bound the rendering or rasterizing area and form the bounding region BL1. Attribute coefficients for the line L1 may be defined using the attribute setup algorithm for a triangle, in which a corresponding portion of attribute coefficients is set to zero or one and a determinant of a triangle is replaced by line segment length in its major direction.

Referring now to FIG. 2C, similar to the y-major line L1 shown in FIG. 2B, three edges are generated and a bounded region BL2 for an x-major line L2 (shown with a broken line) having an edge e0 and coinciding edges e1 and e2. Vertices V0, V1 of the line L2 are disposed on opposing vertical sides of a bounding box 230. Left and right sides of the bounding box 230 are applied to enclose or bound the primitive's area during the scan conversion process. Attribute coefficients for the line L2 may be defined, similar to line L1, using the attribute setup algorithm for a triangle, in which a corresponding portion of attribute coefficients is set to zero.

Referring to the routine 330, at blocks 332 and 334, opposing diagonal vertices V0 and V1 are superimposed on a bounding box 240 to create a bounded region BR of a rectangle. From the vertices V0, V1, three edges of the rectangle are calculated. The three edges e0, e1, and e2 may correspond to any three adjacent sides of the bounding box 240. However, the edges e0, e1, and e2 corresponding lie just inside the corresponding perimeter edges or border of the bounding box 240. While, a rectangular has four intrinsic or real edges or sides, only three edges are calculated. This creates an area which is open along one side. This one side happens to correspond to a side or edge of the perimeter or border of the bounding box 240. In this example, the side is denoted e3. The side e3 bounds the open area created by the three edges of the rectangular-type primitive to form the bounded region BR. For simplicity, the illustration does not show the real edges of the rectangle inside of the bounding box 240.

Referring to FIG. 2D, the three edges e0, e1 and e2 are superimposed in the bounding box 240 to generate the bounded region BR for a rectangle. The bounded region BR is identified by two diagonal vertices V0,V2 from which three edges e0-e2 that coincide, respectively, with diagonal corners and three adjacent sides of a bounding box 240. In the example, a remaining side of the bounding box 240 (i.e., side defined by vertices V0, V1) closes or bounds the area defined by the three edges e0, e1, and e2. Correspondingly, a point sprite is emulated as a contracted rectangle (i.e., square), which center is defined by a vertex V and an area is defined by a point size. A point is a special point sprite, which point size is equal to one pixel. Attribute coefficients for the rectangle and point sprite may be defined using the attribute setup algorithm for a triangle.

Then, at block 336, texture coordinates are determined for a point sprite (e.g., a top left corner is assigned as a coordinate (0.0, 0.0) and a bottom right corner is assigned as a coordinate (1.0, 1.0)) and, at block 338, corresponding determinants are computed.

Figure 4:
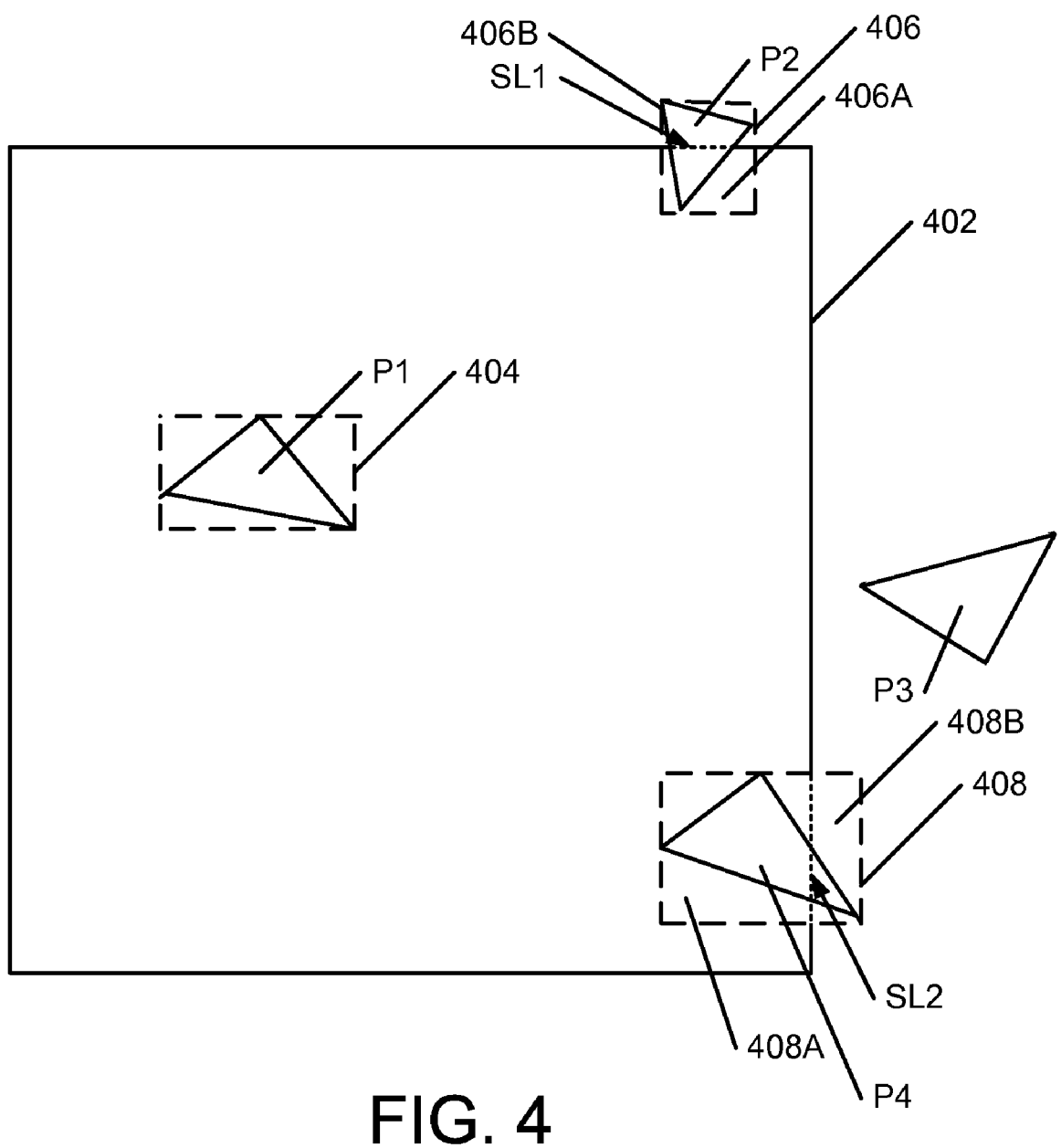
FIG. 4 shows a general block diagram depicting the scissoring process of FIG. 3.

Block 316 of routine 310, block 326 of routine 320, and block 338 of routine 330 are followed by common block 340 where a scissoring process is performed, as best illustrated in FIG. 4. The scissoring process may automatically cut or clip any one of the bounding boxes 404, 406, and 408 and, specifically, the bounded regions P1, P2 and P4 correspond to primitives which lie just inside the scissoring window 402. During the setup process, since the primitive, denoted as P3, lies outside of the scissoring window 402, this primitive is skipped. If a portion of the bounded region 404, 406 and 408 lies outside of the window 402 (corresponding to a display area), such portion is cut or clipped by moving a respective edge of the bounding boxes. Thus, the bounded region is cut or removed from further processing.

In the case of bounding box 404 all of the bounded region P1 and bounding box 404 lies inside of window 402.

In the case of bounding box 406, the area 406A lies inside of the window 402 while portion 406B lies outside of the window 402. The dotted line labeled within the bounding box 406 corresponds to the cut or scissoring line, denoted as SL1. Thus, the bounding box 406 is automatically adjusted to the size of sub-box 406A. Likewise, the size of the bounded region P2 is correspondingly cut or reduced by the amount lying outside of window 402.

In the case of bounding box 408, the cut or scissoring line is denoted as SL2. Thus, box 408 is automatically adjusted to be the size of sub-box 408A. Likewise, the bounded region P4 is reduced by the amount lying outside of the window 402. The primitives and bounding regions shown in FIG. 4 are for illustrative purposes only.

After completion of the position setup processing of block 110, scan conversion (block 340), attribute setup, and interpolation calculations are performed for the graphic primitives using a computer model with three edges such as for a triangle.

In the case of a triangle, three edges can be calculated based on the vertex information. For a line, two real edges can be calculated. The third line edge is set coincident to one of the real edges to complete the set of three real edges. For a rectangle, three real edges are calculated. Although a rectangle intrinsically has four real edges, the universal computer model only requires three.

In one configuration, the universal computer model for the position setup algorithm is based on three edges for all graphic primitives superimposed in a bounding box to create a bounded region for universal rasterization. The three edges define an area in a bounding box to allow those pixels disposed outside a perimeter of the rasterization area to be skipped. Nevertheless, other computer models can be used.

The graphic primitives include triangles, lines, rectangles, and point sprites of the respective image. The bounding boxes 210, 220, 230 and 240 are essentially the same. The automatic and universal adaptability and retrofitting properties allows the boxes to accommodate a universal set of bounding areas for the different graphic primitives.

The three edges, such as for a triangle graphic primitive, are represented as planar equations that are negative to the left of the edge, positive to the right and zero on the edge. The values for these edge equations are calculated using the following unified set of halfplane equations Eq. (1), Eq. (2), Eq. (3):

$$E0(x,y) = a0*x + b0*y + c0; \quad \text{Eq. (1)}$$

$$E1(x,y) = a1*x + b1*y + c1; \text{ and} \quad \text{Eq. (2)}$$

$$E2(x,y) = a2*x + b2*y + c2 \quad \text{Eq. (3)}$$

where the values x and y are a function of the pixel's location and this pixel is considered inside of a triangle if $E0(x,y)$, $E1(x,y)$ and $E2(x,y)$ are all $>=0$. The coefficients for three-edge equations are associated with the screen location such as for the triangle's three vertices. The "inside" pixel (x, y) is further tested against if it is inside the bounding box of the respective primitive. Thus, the unified set of half plane equations Eq. (1), Eq. (2) and Eq. (3) can be used for all graphic primitives of distinct geometrical graphic primitive shapes.

Based on the three edge equations, calculating the results for a pixel needs six multiplications and six addition operations. The cost is expensive. However, the results of the pixel edge equations can be generated by using only one add operation. The three equations can be derived to the following equations Eq. (4), Eq. (5):

$$Ei(x+1,y) - Ei(x,y) = ai; \text{ and} \quad \text{Eq. (4)}$$

$$Ei(x,y+1) - Ei(x,y) = bi \quad \text{Eq. (5)}$$

where i=0, 1, 2; and if there is an initial value of edge equation "i", the next pixel can be found to its right on the same scanline (of the scan conversion process) by adding "ai," or by adding "bi" to get its successor pixel on the same vertical line. Thus, equations Eq. (4) and Eq. (5) can be used for all graphic primitives of distinct geometrical graphic primitive shapes during the scan conversion process. At block 120, a scan conversion process is performed for the graphic primitives using the primitives' retrofitted bounded region in the bounding box. The scan conversion process converts, according to pre-determined drawing rules, inputted graphics data in a format compatible with a specific type of a display. During the scan conversion process, the pixels residing inside the primitives' retrofitted bounded region in the bounding box are evaluated from each edge to determine at least one pixel coordinate and coverage mask. The bounding box is used in the scan conversion process of block 120 to limit the range of the scan conversion process to an area between the three edges and limited to the border of the bounding box in at least one direction, in the case of rectangle-type primitives and point sprite-type primitives, and in two directions in the case of a line-type primitive.

At block 130, an attribute setup process computes gradients of pixel attributes (or parameters) along vertical and horizontal axes of the respective display and, at block 140, an attribute interpolation process determines attributes for the pixels of display. The pixel attributes include a pixel color, texture coordinates, etc. In the exemplary configuration, a plurality of pixel attributes are determined for each pixel when performing attribute interpolation.

In operation, computational routines of the method 100 are consecutively performed for all graphic primitives of the respective image.

In exemplary configurations, the method 100 may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium.

The term "computer storage medium" refers herein to any medium adapted for storing the instructions that cause the computer to execute the method. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

Figure 5:
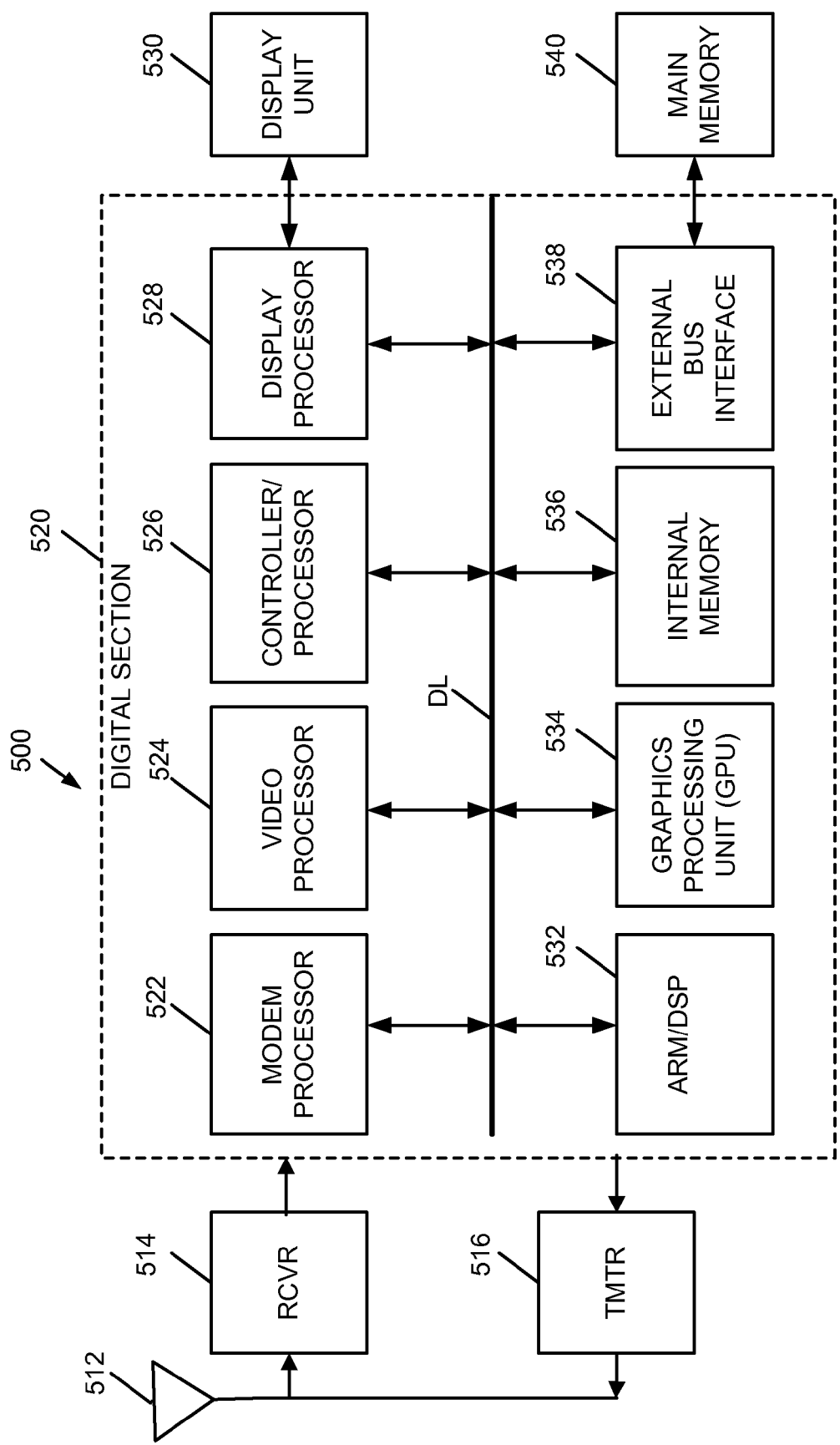
FIG. 5 shows a general block diagram of an exemplary device implementing the method of FIG. 1.

FIG. 5 shows a block diagram of an configuration of a wireless device 500 in a wireless communication system. The wireless device 500 may be a cellular or camera phone, a terminal, a handset, a personal digital assistant (PDA), or some other device. The wireless communication system may be a Code Division Multiple Access (CDMA) system, a Global System for Mobile Communications (GSM) system, or some other system.

The wireless device 500 is capable of providing bi-directional communications via a receive path and a transmit path. On the receive path, signals transmitted by base stations are received by an antenna 512 and provided to a receiver (RCVR) 514. The receiver 514 conditions and digitizes the received signal and provides samples to a digital section 520 for further processing. On the transmit path, a transmitter (TMTR) 516 receives data to be transmitted from the digital section 520, processes and conditions the data, and generates a modulated signal, which is transmitted via the antenna 512 to the base stations.

The digital section 520 includes various processing, interface and memory units such as, for example, a modem processor 522, a video processor 524, a controller/processor 526, a display processor 528, an ARM/DSP 532, a graphics processing unit (GPU) 534, an internal memory 536, and an external bus interface (EBI) 538. The modem processor 522 performs processing for data transmission and reception (e.g., encoding, modulation, demodulation, and decoding). The video processor 524 performs processing on video content (e.g., still images, moving videos, and moving texts) for video applications such as camcorder, video playback, and video conferencing. The controller/processor 526 may direct the operation of various processing and interface units within digital section 520. The display processor 528 performs processing to facilitate the display of videos, graphics, and texts on a display unit 530. The ARM/DSP 532 may perform various types of processing for the wireless device 500. The graphics processing unit 534 performs graphics processing including the method 100 for universally rasterizing graphic primitives.

The techniques described herein may be used for any of the processors in the digital section 520, e.g., the graphics processing unit 534. The internal memory 536 stores data and/or instructions for various units within the digital section 520. The EBI 538 facilitates the transfer of data between the digital section 520 (e.g., internal memory 536) and a main memory 540 along a bus or data line DL.

The digital section 520 may be implemented with one or more DSPs, micro-processors, RISCs, etc. The digital section 520 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

While the configuration of FIG. 5 is representative of a wireless communications device, the device 500 may, for example, be a cellular phone, a video game console, a PDA, a laptop computer, or a video-enabled MP3 player, among other mobile or stationary video-enabled devices.

Figure 6:
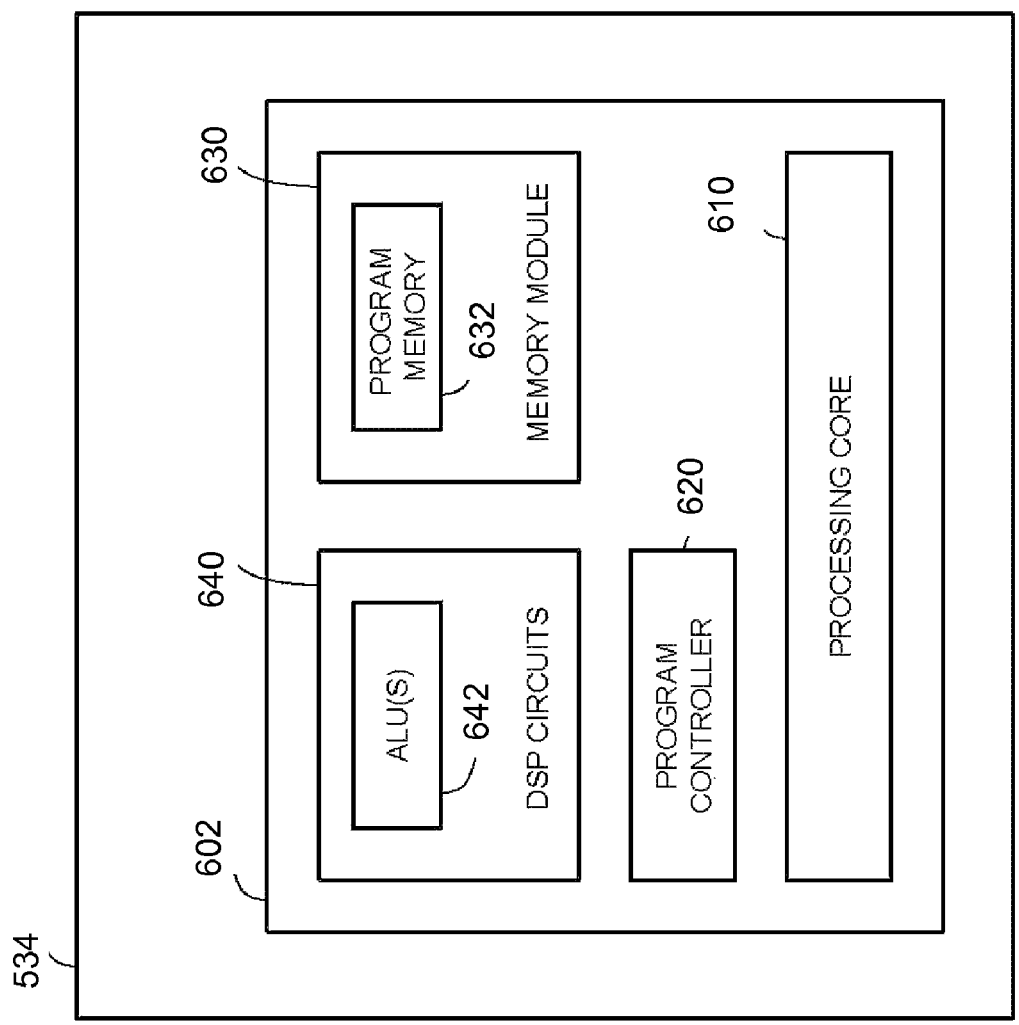
FIG. 6 shows a high-level block diagram of an exemplary graphic processing unit.

FIG. 6 shows a high-level block diagram of an exemplary graphic processing unit 534. The GPU 534 includes a processing core 610, a program controller 620, a memory module 630, and special processing circuits 640 having a plurality of arithmetic-logic units (ALUs) 642 adapted to perform graphic primitives related calculations. In exemplary configurations, the GPU 534 may be a stand-alone component or a portion of a system-on-chip (SOC) device of the device 500.

Generally, the GPU 534 is fabricated as at least one integrated circuit (IC) or a portion thereof. The GPU 534 may be compliant with, for example, a document "OpenVG Specification, Version 1.0," Jul. 28, 2005, which is publicly available. This document is a standard for 2-D vector graphics suitable for handheld and mobile devices, such as cellular phones and other referred to above wireless communication apparatuses. The GPU 534 may also be compliant with public graphics standard, such as OpenGL2.0, OpenGL ES2.0, or D3D9.0.

The memory module 630 includes a program memory 632, which contains software modules that includes instructions for carrying out the method for universally rasterizing various graphic primitives. In the GPU 534, the same ALUs may perform rasterization-related calculations to universally rasterize all graphic primitives based on a pre-determined graphic primitive model. In this case, the model is generally for a triangle.

As a result, a number of ALUs needed for rendering video data in the device 500 may be reduced. Additionally or alternatively, excessive ALUs may be used for accelerating other programs executed by the GPU 534.

Herein, aspects of the present invention are illustratively described within the context of rasterizing techniques for lines, rectangles, and point sprites. It will be appreciated by those skilled in the art that the invention may also be utilized within the context of other 2D or 3D graphic primitives. Utilization of the method 100 for rasterization of computer graphics imagery using such graphic primitives has been contemplated and is within the scope of the present invention. More specifically, in particular applications, these graphic primitives may require retrofitting to a single pre-determined graphic primitive using the techniques similar to those discussed above in reference to FIGS. 1-4.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A device adapted for rasterizing graphics primitives comprising:
a processing unit including means for superimposing vertices for an identified graphic primitive on a bounding box and means for determining only three edges bounded by the bounding box for the identified graphic primitive, wherein the means for determining determines the three edges for distinct geometrical graphic primitive shapes including a triangle, a line, a rectangle, and a point sprite in order to retrofit the identified graphic primitive; and
a memory coupled to the processing unit.

2. The device of claim 1, wherein the means for superimposing includes means for superimposing the bounding box in a scissoring window and automatically cutting any portion of the bounding box lying outside of the scissoring window to retrofit the identified graphic primitive.

3. The device of claim 2, wherein the processing unit further includes: means for determining a bounded region for the identified graphic primitive based on the bounding box and the three edges; and means for performing a scan conversion process on the bounded region and for a triangle graphic primitive based on three edge coefficients of a triangle and a half plane rule.

4. The device of claim 1, wherein the processing unit further includes means for applying a diamond exit rule when the identified graphic primitive is a line graphic primitive; and wherein the means for superimposing includes means for setting each opposing edge of a line to one of two edges of the determined three edges, setting a third edge of the determined three edges to be coincident with one of the two edges of the determined three edges, and bounding a rendering area between the two edges of the determined three edges with opposite perimeter edges of the bounding box to bound the rendering area of the line and form a bounded region.

5. The device of claim 1, wherein the identified graphic primitive is a rectangle; and wherein the means for superimposing includes means for setting three adjacent edges of the rectangle to lie within a perimeter of the bounding box and for bounding a rendering area of the rectangle with an edge of the perimeter of the bounding box to form a bounded region.

6. The device of claim 5, wherein the processing unit further includes means for emulating a point sprite as the rectangle if the identified graphic primitive is the point sprite.

7. The device of claim 1, wherein the means for superimposing includes means for setting three edges of a triangle to coincide with the determined three edges if the identified graphic primitive is the triangle.

8. The device of claim 1, wherein the processing unit comprises arithmetic logic units (ALUs) to universally rasterize all graphic primitives based on a pre-determined graphic primitive model.

9. The device of claim 1, wherein the processing unit is a portion of a cellular phone, a wireless device, a wireless communications device, a video game console, a personal digital assistant (PDA), a laptop computer, or an audio/video-enabled device.

10. The device of claim 1, wherein the processing unit is adapted to use a unified set of half plane equations to determine the three edges for each graphic primitive of the distinct geometrical shapes.

11. The device of claim 10, wherein the unified set of half plane equations include three equations.

12. The device of claim 10, wherein the unified set of half plane equations include $$E0(x,y)=a0*x+b0*y+c0;$$

$$E1(x,y)=a1*x+b1*y+c1; \text{ and}$$

$$E2(x,y)=a2*x+b2*y+c2,$$

wherein $E0(x,y)$ is a first edge of the determined three edges, $E1(x,y)$ is a second edge of the determined three edges, $E2(x,y)$ is a third edge of the determined three edges, and a0, a1, a2, b0, b1, b2, c0, c1, and c2 are coefficients for identifying x, y intercepts and a slope.

13. The device of claim 12, wherein a pixel is considered inside a triangle if $E0(x,y)$, $E1(x,y)$, and $E2(x,y)$ are all $>=0$.

14. An apparatus adapted for rasterizing graphics primitives comprising:
    means for superimposing vertices for an identified graphic primitive on a bounding box; and
    means for determining only three edges bounded by the bounding box for the identified graphic primitive, wherein the means for determining determines the three edges for distinct geometrical graphic primitive shapes including a triangle, a line, a rectangle, and a point sprite in order to retrofit the identified graphic primitive.

15. The apparatus of claim 14, wherein the means for superimposing includes means for superimposing the bounding box in a scissoring window and automatically cutting any portion of the bounding box lying outside of the scissoring window to retrofit the identified graphic primitive.

16. The apparatus of claim 14, further comprising: means for determining a bounded region for the identified graphic primitive based on the bounding box and the three edges; and means for performing a scan conversion process on the bounded region and for a triangle graphic primitive based on three edge coefficients of a triangle and a half plane rule.

17. The apparatus of claim 14, further comprising means for applying a diamond exit rule when the identified graphic primitive is a line graphic primitive; and wherein the means for superimposing includes means for setting each opposing edge of a line to one of two edges of the determined three edges, setting a third edge of the determined three edges to be coincident with one of the two edges of the determined three edges, and bounding a rendering area between the two edges of the determined three edges with opposite perimeter edges of the bounding box to bound the rendering area of the line and form a bounded region.

18. The apparatus of claim 14, further comprising means for emulating a point sprite as a rectangle if the identified graphic primitive is a point sprite.

19. The apparatus of claim 14, wherein the means for superimposing includes means for setting three edges of a triangle to coincide with the determined three edges if the identified graphic primitive is the triangle.

20. An integrated circuit adapted for rasterizing graphics primitives comprising:
    a processing unit including means for superimposing vertices for an identified graphic primitive on a bounding box and means for determining only three edges bounded by the bounding box for the identified graphic primitive, wherein the means for determining determines the three edges for distinct geometrical graphic primitive shapes including a triangle, a line, a rectangle, and a point sprite in order to retrofit the identified graphic primitive; and
    a storage unit to store operands and results for the processing unit.

21. The integrated circuit of claim 20, wherein the processing unit comprises arithmetic logic units (ALUs) to universally rasterize all graphic primitives based on a pre-determined graphic primitive model.

22. A wireless device adapted for rasterizing graphic primitives comprising:
    a graphics processing unit adapted to implement a set of operations for superimposing vertices for an identified graphic primitive on a bounding box and for determining only three edges bounded by the bounding box for the identified graphic primitive, wherein the three edges are determined for distinct geometrical graphic primitive shapes including a triangle, a line, a rectangle, and a point sprite in order to retrofit the identified graphic primitive; and
    a memory coupled to the graphics processing unit.

23. The wireless device of claim 22, wherein the graphics processing unit comprises arithmetic logic units (ALUs) to universally rasterize all graphic primitives based on a pre-determined graphic primitive model.

24. The wireless device of claim 22, wherein the graphics processing unit is a portion of a cellular phone, a wireless device, a wireless communications device, a video game console, a personal digital assistant (PDA), a laptop computer, or an audio/video-enabled device.

25. A computer readable storage medium comprising instructions for causing a computer to:
    superimpose vertices for an identified graphic primitive on a bounding box; and
    determine only three edges bounded by the bounding box for the identified graphic primitive, wherein the instructions to determine comprise instructions to determine the three edges for distinct geometrical graphic primitive shapes including a triangle, a line, a rectangle, and a point sprite in order to retrofit the identified graphic primitive.

26. The computer readable storage medium of claim 25, wherein the instructions further cause the computer to superimpose the bounding box in a scissoring window and automatically cut any portion of the bounding box lying outside of the scissoring window to retrofit the identified graphic primitive.

27. The computer readable storage medium of claim 25, wherein the instructions further cause the computer to:
    determine a bounded region for the identified graphic primitive based on the bounding box and the three edges; and
    perform a scan conversion process on the bounded region and for a triangle graphic primitive, the scan conversion process being based on three edge coefficients of a triangle and a half plane rule.

28. The computer readable storage medium of claim 25, wherein the instructions further cause the computer to perform at least one of:
    determine coefficients for attribute setup;
    determine texture coordinates for a point sprite graphic primitive;
    compute a determinant of a triangle graphic primitive;
    compute a determinant of a rectangle graphic primitive;
    perform a backface culling process for the triangle graphic primitive;
    perform a scissoring process;
    perform a scan conversion process; and
    perform attribute setup and interpolation processes.

29. A method for rasterizing graphic primitives comprising:
   superimposing vertices for an identified graphic primitive on a bounding box; and
   determining, with a processing unit, only three edges bounded by the bounding box for the identified graphic primitive, wherein the three edges are determined for distinct geometrical graphic primitive shapes including a triangle, a line, a rectangle, and a point sprite in order to retrofit the identified graphic primitive.

30. The method of claim 29, further comprising superimposing the bounding box in a scissoring window and automatically cutting any portion of the bounding box lying outside of the scissoring window to retrofit the identified graphic primitive.

31. The method of claim 29, further comprising: determining a bounded region for the identified graphic primitive based on the bounding box and the three edges; and performing a scan conversion process on the bounded region and for a triangle graphic primitive, the scan conversion process being based on three edge coefficients of a triangle and a half plane rule.

32. The method of claim 29, further comprising at least one of:
   determining coefficients for attribute setup;
   determining texture coordinates for a point sprite graphic primitive;
   computing a determinant of a triangle graphic primitive;
   computing a determinant of a rectangle graphic primitive;
   performing a backface culling process for the triangle graphic primitive;
   performing a scissoring process;
   performing a scan conversion process; and
   performing attribute setup and interpolation processes.

* * * * *